Feb. 1, 1938.   K. W. MACKSEY   2,107,204
MOLDED KNOB
Filed March 17, 1937
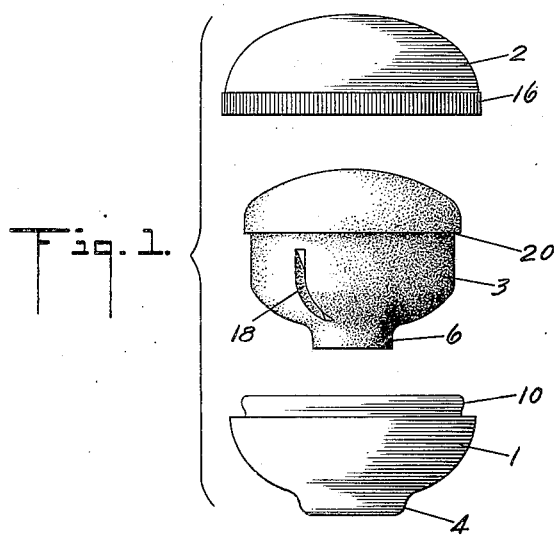
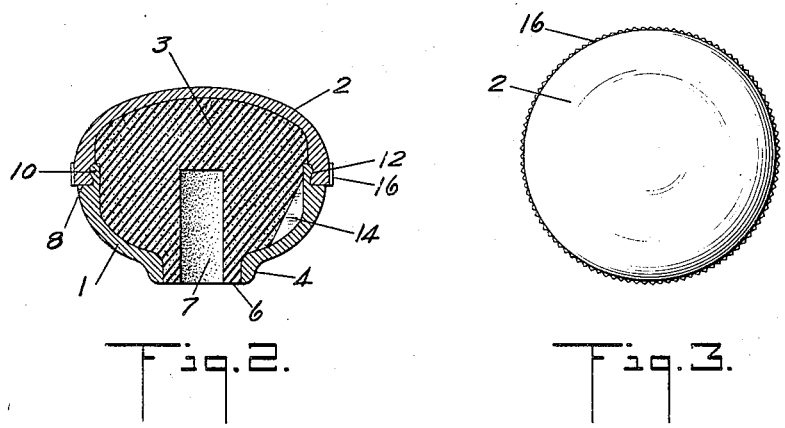
INVENTOR
KENNETH W. MACKSEY
BY HIS ATTORNEYS
Howson and Howson Patented Feb. 1, 1938

2,107,204

UNITED STATES PATENT OFFICE 2,107,204

MOLDED KNOB

Kenneth W. Macksey, Montclair, N. J., assignor to Mack Molding Company, Wayne, N. J., a corporation of New Jersey Application March 17, 1937, Serial No. 131,503

2 Claims. (Cl. 16—121)

This invention relates to molded knobs of general application and more particularly to molded knobs designed for attachment to a supporting member and it is an object of this invention to provide a molded knob of improved construction which may be readily attached to a rod, as the gear shift lever of an automobile, and which when attached, is quiet at all speeds of the vehicle.

It is a further object of this invention to provide a molded knob consisting of a plurality of parts which may be readily assembled to form a solid knob and it is also an object of this invention to provide a knob which may be readily manufactured and without necessitating complicated dies or involved manufacturing processes.

In the drawing:

Fig. 1 is a view in elevation of the parts comprising a knob in accordance with this invention, the parts being shown separated;

Fig. 2 is a central vertical sectional view of a knob completely assembled; and

Fig. 3 is a top plan view of the knob shown in Fig. 2.

Knobs molded of plastic molding material because of the facility with which they may be shaped and manufactured and the color possibilities of the various plastic molding materials have been considered desirable as handles for many purposes but where the knob is subjected to vibration, as on the gear shift levers of automobiles, hollow knobs or knobs with light fillers have been found to have an objectionable hum or continuous low note at certain speeds of the vehicle and to overcome this objection it has been proposed to make the knobs solid. Solid knobs of a plastic molding material have been found costly because of the amount of material used and the time required for completely curing the knob in the mold while knobs having a core, as of wood, and a covering of plastic molding material molded about the core have been found unsatisfactory because of the mold structure found necessary to properly accommodate the core and the complications in the molding operation resulting from the presence of the core.

To overcome the various objections both as to the knob and the necessary dies and manufacturing process, a knob constructed in accordance with this invention comprises a shell of plastic molding material molded in two parts, a bottom or base portion 1 and a top or cap portion 2, and a solid rubber insert or filler 3. Both shell portions 1 and 2 are, as shown, substantially cup-shaped, the bottom portion 1 being formed with a flange portion 4 at its bottom forming an opening of sufficient diameter to receive the rod on which the knob is mounted and a flange portion 6 of the filler 3 forming the outer portion of the opening 7 in the filler in which the supporting rod is received. At its upper edge 8 the bottom portion 1 is provided with a flange 10 of less thickness than the wall immediately below said flange, the flange 10 and upper edge 8 forming a seat for complementary shaped portions on the cap portion 2, the engaging faces of the flanges being given a curved shape, as shown at 12, if desired, to interlock the cap and base portions together. The base portion may be provided with reenforcing ribs 14 and the cap portion with a ribbed band portion 16.

The rubber filler 3 is shaped during manufacture to fit the interior of the shell formed when the cap and base portions 2 and 1, respectively, are secured together but is made slightly large so as to be under moderate compression and is slotted, as at 18, to receive the ribs 14 and shouldered, as at 20, to seat on the flange 10. Making the filler 3 slightly larger than the interior of the shell insures it being held in engagement with the walls of the cap and base portions of the shell and the pressure of the filler on the walls together with the weight of the filler and the nature of the material of which the filler is formed effectively prevents vibration and any humming under all conditions. The construction of the knob also insures sufficient pressure being maintained on the rod or support inserted in the opening 7 to frictionally secure the knob on the rod irrespective of whether the rod end is threaded or not.

The engagement of the ribs 14 in the slots 18 prevents rotation of the shell with respect to the filler when the knob is mounted on a supporting rod for use.

In manufacturing the knob, the base portion 1 and cap portion 2 of the shell are formed of suitable plastic molding material by the usual molding process and the filler 3 is molded of rubber by a suitable process. Before assembling the flange of either the cap or base section is dipped in acetone, the filler is inserted in the base portion with the slots 18 relieving the ribs 14 and then the cap portion 2 is applied, being forced onto the flange of the base portion by suitable pressure and kept subjected to suitable pressure until the acetone dries, fusing the cap and base portions together.

What is claimed is:—

1. A knob comprising cap and base sections of plastic molding material secured together to form a shell, a rubber filler fitting said shell and compressed thereby and cooperating means on said shell and filler preventing relative rotation thereof.

2. A knob comprising cap and base sections of plastic molding material secured together to form a shell and a rubber filler fitting said shell and compressed thereby, said base section having reinforcing ribs and said filler having grooves receiving said ribs and preventing relative rotation of said shell and filler.

KENNETH W. MACKSEY.